United States Patent [19]

Boshears

[11] Patent Number: 5,579,725
[45] Date of Patent: Dec. 3, 1996

[54] CAT TOY

[75] Inventor: Michael B. Boshears, Tulsa, Okla.

[73] Assignee: MegaDyne Products, Inc., Tulsa, Okla.

[21] Appl. No.: 566,633

[22] Filed: Dec. 4, 1995

[51] Int. Cl.$^6$ .................................................. A01K 29/00
[52] U.S. Cl. ......................................... 119/706; 119/707
[58] Field of Search ........................... 119/702, 706–711; 446/236, 247, 242, 246; 472/7, 8, 10, 12

[56] References Cited

U.S. PATENT DOCUMENTS

| D. 335,553 | 5/1993 | Conner | D30/160 |
|---|---|---|---|
| D. 348,124 | 6/1994 | O'Rourke et al. | D30/160 |
| 430,322 | 6/1890 | Seinecke | 472/7 |
| 3,486,485 | 12/1969 | Kahanick | 119/1 |
| 3,552,356 | 1/1971 | Rosenthal | 119/1 |
| 3,638,350 | 2/1972 | Wiggen | |
| 3,648,403 | 3/1972 | Gommel | |
| 4,036,178 | 7/1977 | Lee et al. | 119/51 R |
| 4,720,283 | 1/1988 | Williams et al. | 446/69 |
| 4,930,448 | 6/1990 | Robinson | 119/708 |
| 4,969,417 | 11/1990 | Sakano | 119/15 |
| 4,998,364 | 3/1991 | Sengstaken | 472/7 X |
| 5,009,193 | 4/1991 | Gordon | |
| 5,269,261 | 12/1993 | McCance | 119/706 |
| 5,390,629 | 2/1995 | Simone | 119/711 |

FOREIGN PATENT DOCUMENTS 664618  5/1979  U.S.S.R. .

OTHER PUBLICATIONS

Mail order catalog page 29 featuring item G. The "Claw Dandy" scratch pad. (date unknown).
"Old Village Shop Catalog" page 46 featuring item E. Bizzy Kitty™ scratching pad. Mar. 14, 1990.
"Animail" mail order catalog page 27 featuring item H Cat Track™. Jan. 22, 1991.
"Animail" mail order catalog page 44 featuring item B Kitty Pong. Jan. 22, 1991.
"Animail" mail order catalog page 68 featuring an advertisement for CAT-A-COMBS. Jan. 22, 1991.
WO87/04046 (MOHR) Jul. 1987.

Primary Examiner—Mickey Yu
Attorney, Agent, or Firm—Dunlap & Codding, P.C.

[57] ABSTRACT

A cat toy having a generally hollow, circular housing containing a toy animal simulating a mouse. The toy animal is mounted on the outer end of a motor-driven arm, whereby the toy animal will be moved in a circular pattern around the interior of the housing. Openings are provided in the housing, through which a cat can extend a paw to engage and play with the toy animal.

6 Claims, 2 Drawing Sheets

CAT TOY

FIELD OF THE INVENTION

This invention relates to improvements in toys to be used by pet cats.

BACKGROUND OF THE INVENTION

The cat toy of this invention basically comprises a generally circular, hollow housing with a motor-driven toy animal, such as a mouse, therein arranged such that the toy animal is moved in a circular pattern and is accessible to the cat through openings in the housing, such that the cat can stop the toy animal at various locations and the toy animal will continue moving when released by the cat.

DESCRIPTION OF THE PREFERRED EMBODIMENT

Figure 1:
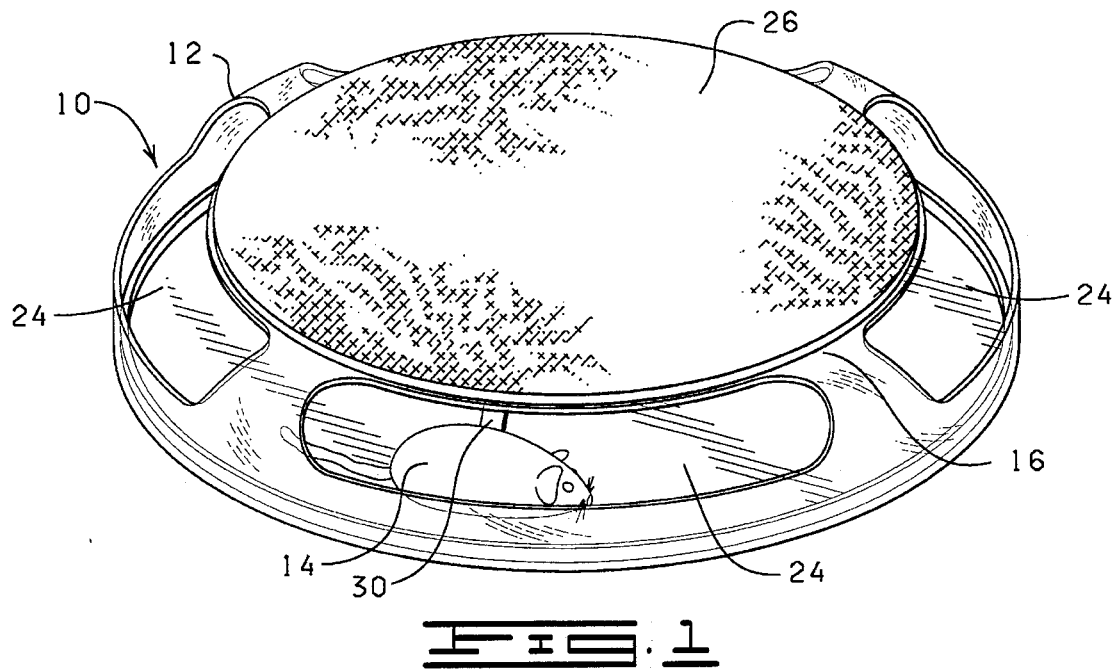
FIG. 1 is a perspective view of the toy.
Figure 2:
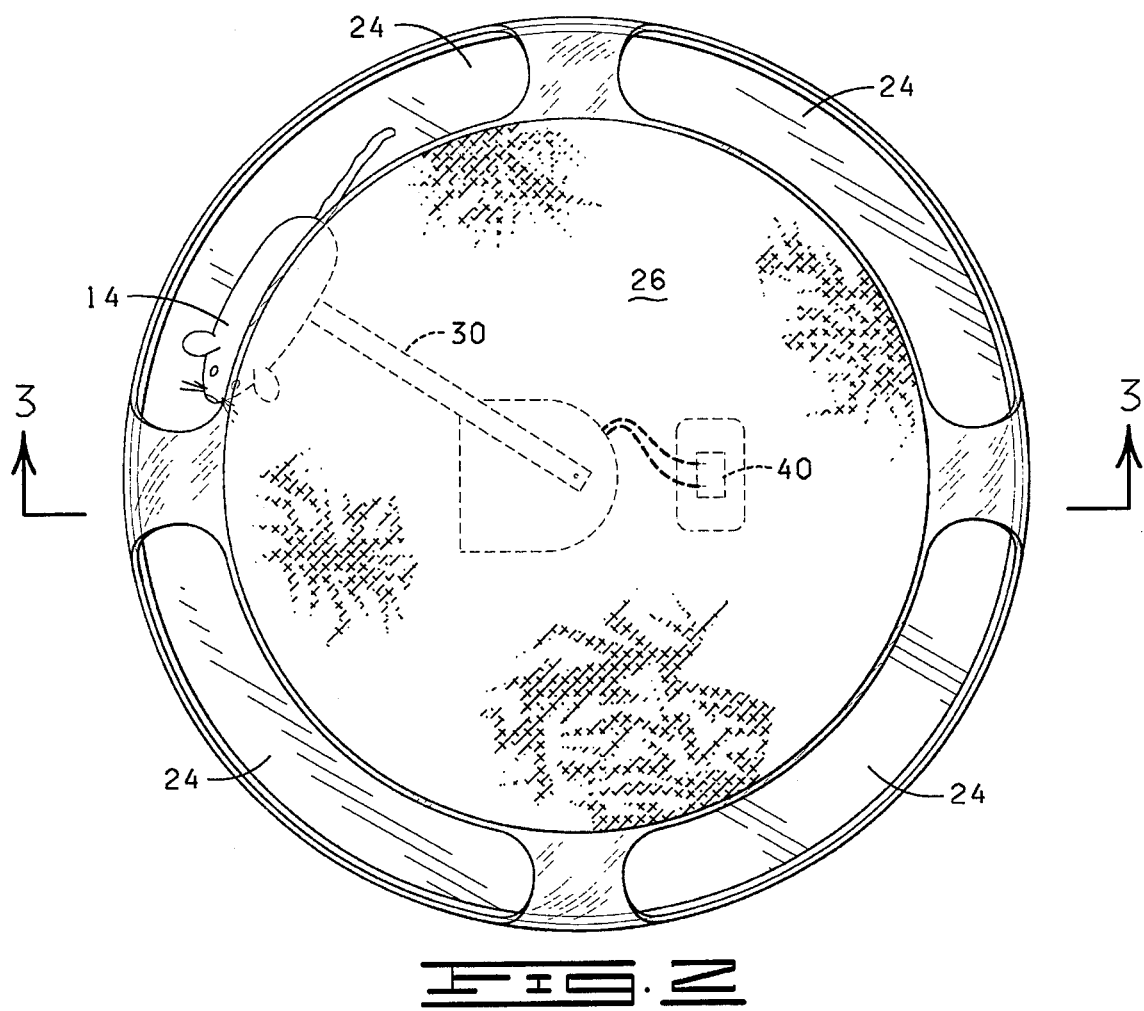
FIG. 2 is a plan view of the toy.

The cat toy, generally designated by reference character 10, basically comprises a hollow housing 12 containing a motor-driven toy animal 14 therein simulating a mouse. The housing 12 comprises a generally circular top 16, generally circular bottom 18 and a sidewall 20. The top 16 and sidewall 20 are preferably formed of a single member with a rounded transition portion 22. At least the transition portion 22, and preferably the entire member forming the top 16 and sidewall 20 is formed of a transparent material. Also, openings 24 are formed in the transition portion 22, through which a pet cat (not shown) can extend his paw to stop the movement and to play with the toy animal 14. For convenience of manufacture, the top wall 16, bottom wall 18 and sidewall 20 may be formed of a readily formed plastic type material. Preferably, the member forming the top 16 and the sidewall 20 is removably secured to the an upwardly extending flange 25 around the edge of the bottom 18 in a "snap" type fit.

A cat-type scratch pad 26 is secured on the top surface of the top 16. The scratch pad 26 may be made of any suitable material, such as sisal, adhered to the top 16.

Figure 3:
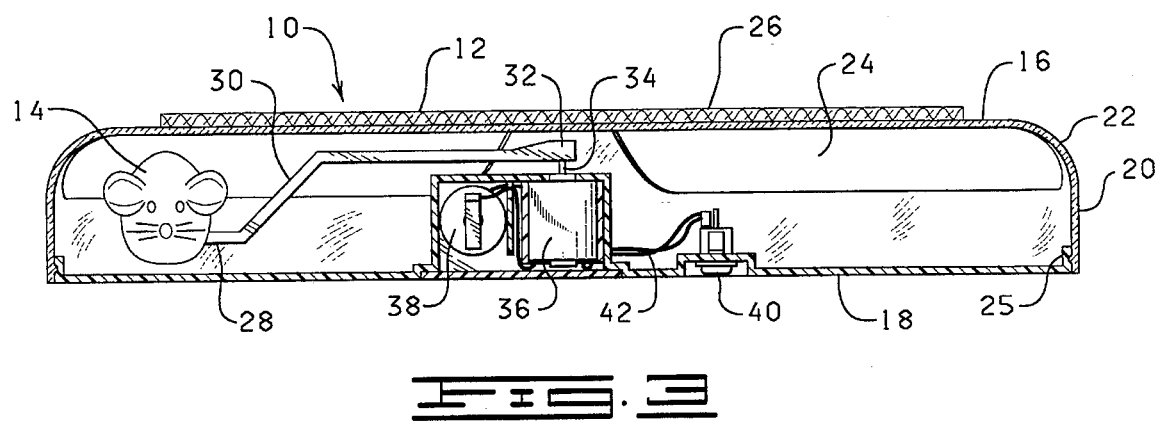
FIG. 3 is a somewhat schematic cross-sectional view of the toy taken along lines 3—3 of FIG. 2.
Figure 4:
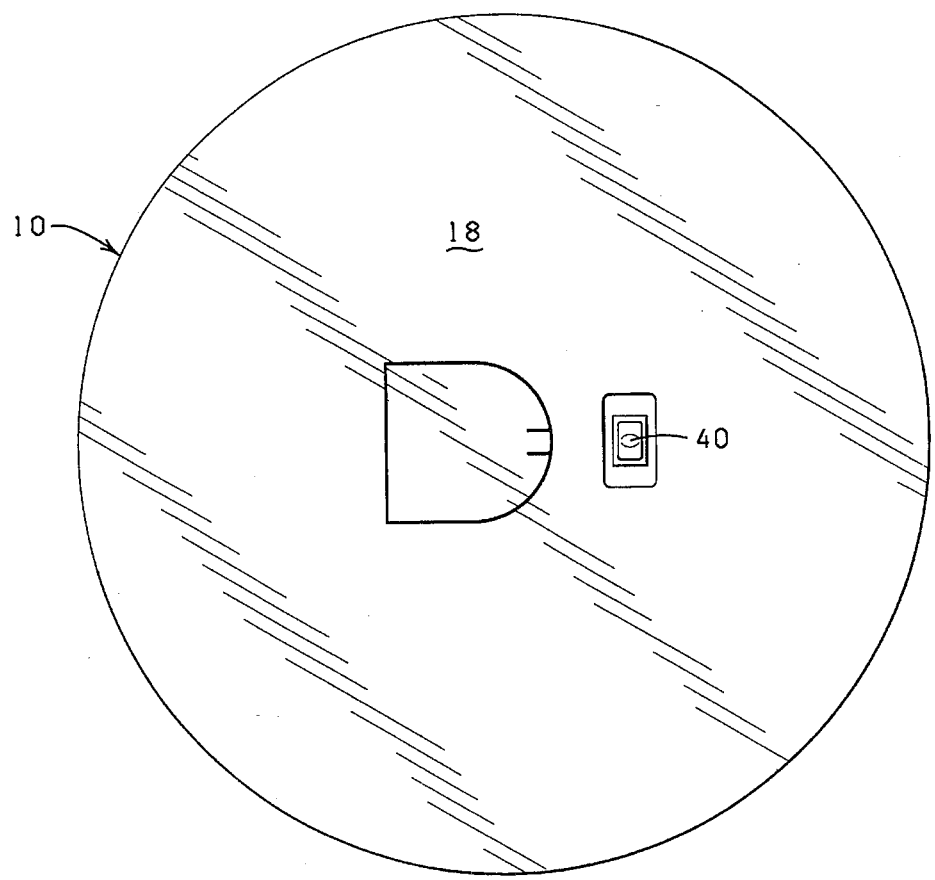
FIG. 4 is a bottom view of the toy.

The toy animal 14 is secured on the outer end 28 of a generally horizontally extending arm 30. The inner end 32 of the arm 30 is suitably secured to the vertical shaft 34 of an electric motor 36. The electric motor 36 is suitably secured in a central portion of the housing 12, preferably to the bottom wall 18 in any suitable manner. The motor 36 is powered by a battery 38, also secured to the bottom wall 18. A manually operated switch 40 is secured to and extends through the bottom 18. The switch 40 is interposed in the connection 42 between the battery 38 and motor 36 in order to energize the motor 36 when desired. As clearly shown in FIGS. 3 and 4, the switch 40 is accessible through the bottom wall 18.

OPERATION

When the motor 36 is energized by operation of the switch 40, the toy animal 14 is moved in a circular pattern around the housing 12 adjacent the openings 24. Thus, a cat using the toy can extend a paw through any one of the openings 24 to catch the toy animal 14. As soon the toy animal 14 is released by the cat, it will continue in a circular pattern.

In an alternate mode of operation, the motor 36 can be de-energized, such that a cat can reach through any one of the openings 24 and move the toy animal 14 of its own accord in a playful fashion.

The scratch pad 26 performs its usual function for entertaining and, perhaps, sharpening the claws of the cat in the usual fashion.

Changes may be made in the combination and arrangement of parts or elements as heretofore set forth in the specification and shown in the drawings without departing from the spirit and scope of the invention as defined in the following claims.

What is claimed is:

1. A cat toy, comprising:
    a generally circular-shaped housing having a circular shaped top, a circular shaped bottom and a generally vertically extending sidewall;
    a motor secured in the central portion of the housing having a vertically extending drive shaft;
    an arm having an inner end and an outer end, with the inner end of the arm secured to the drive shaft, said arm extending generally horizontally toward the sidewall; and
    a toy animal secured on the outer end of the arm, whereby the animal toy may be driven in a circular pattern around the housing;
    wherein the portion of the housing forming the top and sidewall has elongated openings therein aligned with the path of travel of the toy animal of a size that a cat may extend a paw therethrough.

2. A cat toy as defined in claim 1 wherein the toy animal simulates a mouse.

3. A cat toy as defined in claim 1 wherein the sidewall is a continuation of the top, with the lower edge of the sidewall removably secured to the outer edge of the bottom.

4. A cat toy as defined in claim 1 including a scratch pad secured on the top surface of the housing top.

5. A cat toy as defined in claim 1 wherein the motor is an electric motor, a battery secured in the housing connected to the motor, and a switch accessible from the exterior of the housing connected to the battery connection for controlling the operation of the motor.

6. A cat toy as defined in claim 5 wherein the sidewall is made, at least in part, of a transparent material, whereby the toy animal will be visible from the exterior of the toy.

\* \* \* \* \*